US012650876B2

(12) United States Patent
Baronne et al.

(10) Patent No.: US 12,650,876 B2
(45) Date of Patent: Jun. 9, 2026

(54) THREAD EXECUTION CONTROL IN A BARREL PROCESSOR

(71) Applicant: Micron Technology, Inc., Boise, ID (US)

(72) Inventors: Chris Baronne, Allen, TX (US); Dean E. Walker, Allen, TX (US); John Amelio, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 764 days.

(21) Appl. No.: 17/074,920

(22) Filed: Oct. 20, 2020

(65) Prior Publication Data

US 2022/0121483 A1     Apr. 21, 2022

(51) Int. Cl.
| | |
|---|---|
| *G06F 9/48* | (2006.01) |
| *G06F 9/38* | (2018.01) |
| *G06F 9/50* | (2006.01) |
| *G06F 12/0802* | (2016.01) |

(52) U.S. Cl.
CPC .......... *G06F 9/4881* (2013.01); *G06F 9/3851* (2013.01); *G06F 9/3867* (2013.01); *G06F 9/50* (2013.01); *G06F 12/0802* (2013.01); *G06F 2212/60* (2013.01)

(58) Field of Classification Search
None
See application file for complete search history.

(56) References Cited

U.S. PATENT DOCUMENTS

| | | | | |
|---|---|---|---|---|
| 7,822,950 B1 * | 10/2010 | Fotland | ................. | G06F 9/3851 |
| | | | | 712/216 |
| 2006/0179281 A1 | 8/2006 | Jensen et al. | | |
| 2014/0006757 A1 * | 1/2014 | Assarpour | ............. | G06F 9/3854 |
| | | | | 712/226 |

(Continued)

FOREIGN PATENT DOCUMENTS

| | | |
|---|---|---|
| CN | 102103525 | 6/2011 |
| CN | 105426163 A | 3/2016 |
| CN | 107832083 | 3/2018 |

OTHER PUBLICATIONS

AskariHemmat , Jun. 2020, "RISC-V Barrel Processor for Accelerator Control", IEEE (Year: 2020).*

(Continued)

*Primary Examiner* — Wynuel S Aquino
(74) *Attorney, Agent, or Firm* — Schwegman Lundberg & Woessner, P.A.

(57) ABSTRACT

Devices and techniques for thread execution control in a barrel processor are described herein. An apparatus includes a barrel processor, which includes local memory including a hazard data structure; and thread scheduling circuitry; wherein the barrel processor is configured to perform operations through use of the thread scheduling circuitry, the operations including: identifying an instruction to place into a pipeline for the barrel processor, the instruction corresponding to a thread; reading a hazard indication entry from a hazard data structure, the hazard indication entry corresponding to the thread, and wherein the hazard indication entry is set by a preceding instruction in the thread; and in response to reading the hazard indication entry, rescheduling the thread to a later time based on the hazard identification.

26 Claims, 6 Drawing Sheets

(56)                    References Cited

U.S. PATENT DOCUMENTS

| | | | |
|---|---|---|---|
| 2016/0342351 A1* | 11/2016 | Li | .......................... G06F 3/0659 |
| 2017/0192888 A1* | 7/2017 | Moon | ................. G06F 12/0868 |
| 2017/0255397 A1* | 9/2017 | Jayasena | ............. G06F 12/0888 |
| 2017/0300719 A1* | 10/2017 | Jungwirth | ........... G06F 21/6281 |
| 2018/0024951 A1* | 1/2018 | Edmiston | .............. G06F 9/4881 |
| | | | 718/104 |
| 2019/0079775 A1* | 3/2019 | Liland | ................... G06F 9/3851 |
| 2019/0258489 A1* | 8/2019 | Horsnell | ............... G06F 9/3842 |
| 2020/0272467 A1* | 8/2020 | Kesiraju | ............. G06F 9/30038 |
| 2021/0294609 A1* | 9/2021 | Mima | ................... G06F 9/3851 |

OTHER PUBLICATIONS

"Chinese Application Serial No. 202111215375.6, Office Action mailed Feb. 14, 2025", with English translation, 8 pages.
"Chinese Application Serial No. 202111215375.6, Office Action mailed Jul. 31, 2024", w/ English translation, 19 pgs.
"Chinese Application Serial No. 202111215375.6, Response filed Mar. 27, 2025 to Office Action mailed Feb. 14, 2025", w/ English Claims, 18 pgs.
"Chinese Application Serial No. 202111215375.6, Response filed Nov. 29, 2024 to Office Action mailed Jul. 31, 2024", w/ English Claims, 20 pgs.
"Chinese Application Serial No. 202111215375.6, Office Action mailed Jun. 30, 2025", w/ English Translation, 24 pgs.
"Chinese Application Serial No. 202111215375.6, Response filed Sep. 1, 2025 to Office Action mailed Jun. 30, 2025", W/ English Claims, 18 pgs.

* cited by examiner

500

505 — IDENTIFY AN INSTRUCTION OF A THREAD TO PLACE INTO A PIPELINE FOR A BARREL PROCESSOR

510 — READ HAZARD DATA INDICATION ENTRY FROM HAZARD DATA STRUCTURE, THE HAZARD DATA INDICATION ENTRY SET BY A PRECEDING INSTRUCTION OF THE THREAD

515 — RESCHEDULE THREAD TO A LATER TIME BASED ON THE HAZARD INDICATION ENTRY

THREAD EXECUTION CONTROL IN A BARREL PROCESSOR

BACKGROUND

Chiplets are an emerging technique for integrating various processing functionalities. Generally, a chiplet system is made up of discrete modules (each a "chiplet") that are integrated on an interposer, and in many examples interconnected as desired through one or more established networks, to provide a system with the desired functionality. The interposer and included chiplets may be packaged together to facilitate interconnection with other components of a larger system. Each chiplet may include one or more individual integrated circuits (ICs), or "chips", potentially in combination with discrete circuit components, and commonly coupled to a respective substrate to facilitate attachment to the interposer. Most or all chiplets in a system may be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems may include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple ICs or IC assemblies, with different physical, electrical, or communication characteristics may be assembled in a modular manner to provide an assembly providing desired functionalities. Chiplet systems can also facilitate adaptation to suit needs of different larger systems into which the chiplet system will be incorporated. In an example, ICs or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figures 1A, 1B:
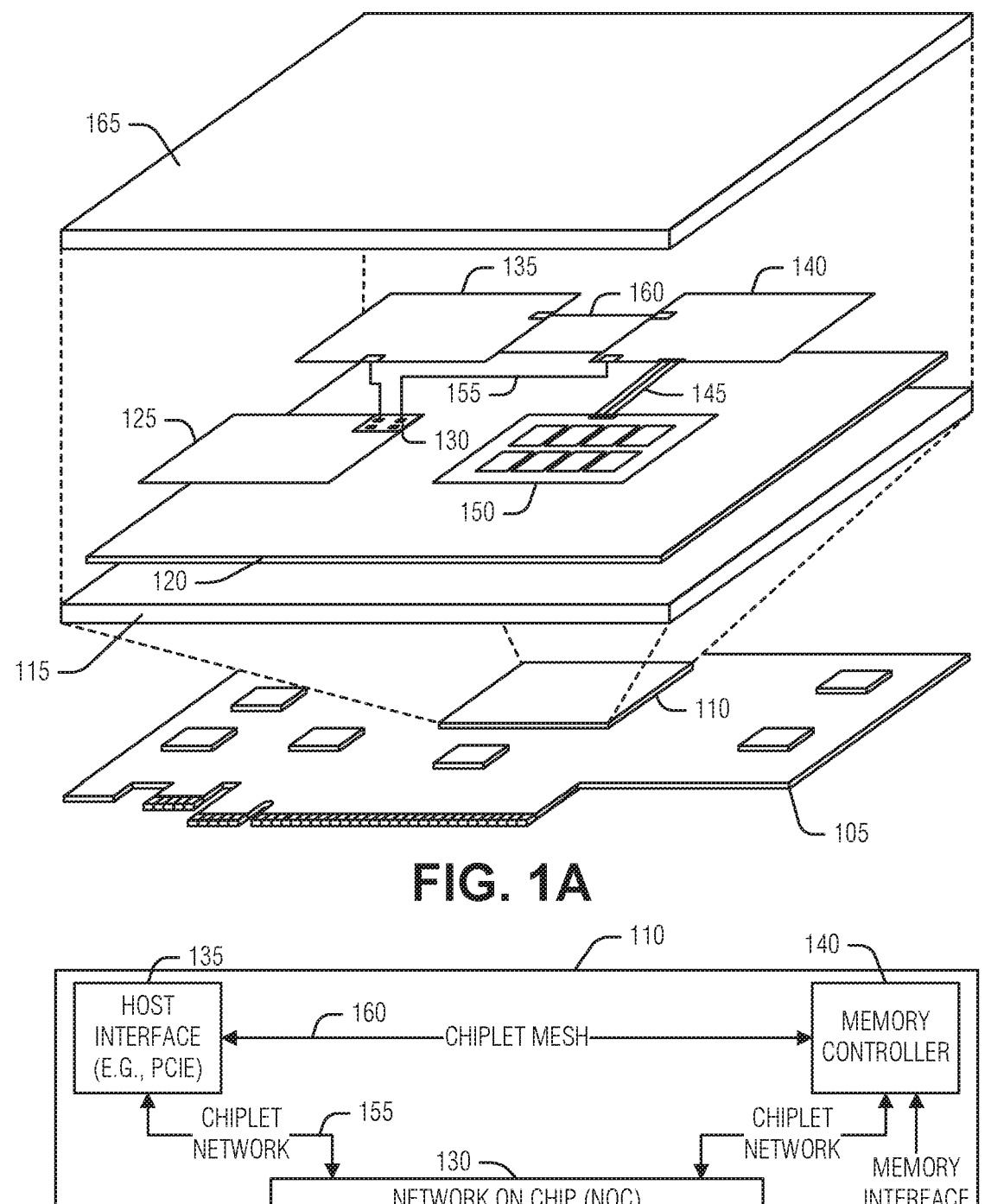
FIGS. 1A and 1B illustrate an example of a chiplet system, according to an embodiment.

FIGS. 1A-1B, described below, offers an example of a chiplet system and the components operating therein. The illustrated chiplet system includes a memory controller. This memory controller includes a programmable atomic unit (PAU) to execute a custom program, a programmable atomic operation, in response to a memory request for the programmable atomic operation. Additional details about the PAU are described below with respect to FIGS. 2 and 3. The processor of the PAU can be barrel-multithreaded and pipelined.

In a multi-threaded processing system, thread control is important to increase efficiency and reduce idle thread time. When a thread initiates a memory request, the memory may be in an indeterminate state such that a later instruction would need to be rescheduled. What is needed is a lookahead signal for the later instruction to understand the cache and memory state before proceeding through the pipeline.

The present disclosure discusses a control mechanism to propagate information about the state of a processor cache and memory request state backwards through the pipeline for thread control decision making. Information about memory being operated on by a thread, such as a cache dirty state or an outstanding memory request, is provided to a later instruction in the thread. This provides an earlier decision on whether to reschedule the thread or allow the thread execution to continue.

Without the control mechanism discussed herein, a thread executing in a barrel processor would need to progress further through the pipeline before determining possible memory contention issues. Additional unnecessary cycles may be spent reading state from various memory devices or preparing a memory request that ultimately would not be valid to send. These cycles result in wasted time and energy when the thread ends up being rescheduled due to the memory state.

The control mechanism provides distinct advantages by allowing earlier detection of unsafe memory access requests. This allows for threads in a barrel processor to be rescheduled more quickly in unsafe cases. Overall throughput is increased, and power draw is reduced as fewer resources are wasted due to aborted operations. Low thread utilization cases become even more efficient because the barrel processor is able to optimize scheduling of those threads that are able to proceed through the pipeline. These efficiencies can be of particular benefit in a chiplet system including a memory controller, as such systems offer modular capabilities that can, in some embodiments, be configured for enabling relatively high performance memory operations required for systems performing a large number of, and/or relatively high complexity computations.

For example, various forms of navigation-directed systems may need to coordinate data from multiple sensors essentially simultaneously to perform the navigation function. An example use for such a chiplet system implementing a memory system including a memory controller with one or more forms of memory would be a self-driving vehicle in which data from various ranging sensors such as radar, lidar, and/or ultrasonic sensors, may be correlated with data from multiple optical sensors (potentially requiring image processing and pattern identification), gyroscopes, skid sensors, etc.

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe) interface, for example. The chiplet system 110 includes a package substrate 115, an interposer 120, and four chiplets: an application chiplet 125, a host interface chiplet 135, a memory controller chiplet 140, and a memory device chiplet 150. Other systems may include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 may be included on the application chiplet 125. In an example, NOC 130 may be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB control or subordinate (i.e., "master" or "slave") depending on which chiplet provides the master clock. AIB I/O cells support three clocking modes: asynchronous (i.e., non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e., 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across connected chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR6), can also be used to interconnect chiplets. Connection of a chiplet system or individual chiplets to external devices (such as a larger system can be through a desired interface (for example, a PCIE interface). Such as external interface may be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a Double Data Rate (DDR) interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh may be controlled by a host processor or a memory controller at some times, and at other times controlled by the DRAM memory device, or by logic associated with one or more DRAM devices, such as an interface chip (in an example, a buffer).

Atomic operations are a data manipulation that, for example, may be performed by the memory controller chiplet 140. In other chiplet systems, the atomic operations may be performed by other chiplets. For example, an atomic operation of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the command's success to the application chiplet 125. Atomic operations avoid transmitting the data across the chiplet network 160, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM, synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the peripheral board 105. For many applications, multiple memory device chiplets may be provided. In an example, these memory device chiplets may each implement one or multiple storage technologies. In an example, a memory chiplet may include, multiple stacked memory die of different technologies, for example one or more SRAM devices stacked or otherwise in communication with one or more DRAM devices. Memory controller 140 may also serve to coordinate operations between multiple memory chiplets in chiplet system 110; for example, to utilize one or more memory chiplets in one or more levels of cache storage, and to use one or more additional memory chiplets as main memory. Chiplet system 110 may also include multiple memory controllers 140, as may be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
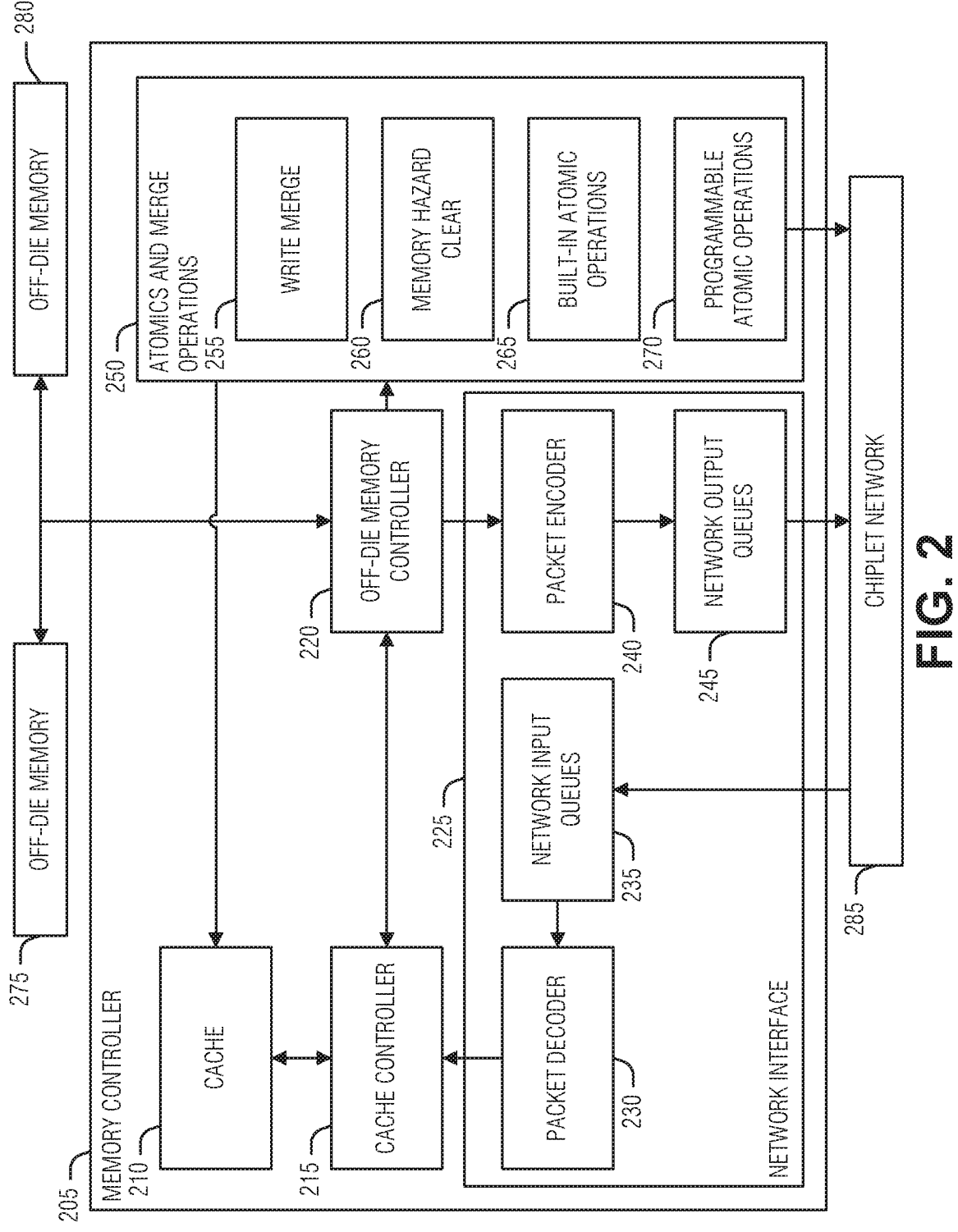
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 275), a network communication interface 225 (e.g., to interface with a chiplet network 285 and communicate with other chiplets), and a set of atomic and merge units 250. Members of this set can include, for example, a write merge unit 255, a memory hazard unit 260, built-in atomic unit 265, or a PAU 270. The various components are illustrated logically, and not as they necessarily would be implemented. For example, the built-in atomic unit 265 likely comprises different devices along a path to the off-die memory. For example, the built-in atomic unit 265 could be in an interface device/buffer on a memory chiplet, as discussed above. In contrast, the programmable atomic unit 270 could be implemented in a separate processor on the memory controller chiplet 205 (but in various examples may be implemented in other locations, for example on a memory chiplet).

The off-die memory controller 220 is directly coupled to the off-die memory 275 (e.g., via a bus or other communication connection) to provide write operations and read operations to and from the one or more off-die memory devices, such as off-die memory 275 and off-die memory 280. In the depicted example, the off-die memory controller 220 is also coupled for output to the atomic and merge unit 250, and for input to the cache controller 215 (e.g., a memory side cache controller).

In the example configuration, cache controller 215 is directly coupled to the cache 210, and may be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet

205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge unit 250, or both. As noted above, one or more levels of cache may also be implemented in off-die memories 275 or 280; and in some such examples may be accessed directly by cache controller 215. Data read by the off-die memory controller 220 can be cached in the cache 210 by the cache controller 215 for later use.

The atomic and merge unit 250 are coupled to receive (as input) the output of the off-die memory controller 220, and to provide output to the cache 210, the network communication interface 225, or directly to the chiplet network 285. The memory hazard unit 260, write merge unit 255 and the built-in (e.g., predetermined) atomic unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operation, the built-in atomic unit 265 receives the request and reads data, either from the write merge unit 255 or directly from the off-die memory controller 220. The atomic operation is performed, and using the write merge unit 255, the resulting data is written to the cache 210, or provided to the network communication interface 225 to encode and prepare a response or return data packet for transmission on the chiplet network 285.

The built-in atomic unit 265 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 285. The request packet has a physical address, atomic operator type, operand size, and optionally up to 32-bytes of data. The atomic operation performs the read-modify-write to a cache memory line of the cache 210, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as comparatively simple, single cycle, integer atomics—such as fetch-and-increment or compare-and-swap—which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic operation unit 265 to perform the requested atomic operation. Following the atomic operation, in addition to providing the resulting data to the packet encoder 240 to encode outgoing data packets for transmission on the chiplet network 285, the built-in atomic operation unit 265 provides the resulting data to the write merge unit 255, which will also write the resulting data to the cache 210. Following the writing of the resulting data to the cache 210, any corresponding hazard bit which was set will be cleared by the memory hazard unit 260.

The PAU 270 enables high performance (high throughput and low latency) for programmable atomic operations (also referred to as "custom atomic transactions" or "custom atomic operations"), comparable to the performance of built-in atomic operations. Rather than executing multiple memory accesses, in response to an atomic operation request designating a programmable atomic operation and a memory address, circuitry in the memory controller chiplet 205 transfers the atomic operation request to PAU 270 and sets a hazard bit stored in a memory hazard register corresponding to the memory address of the memory line used in the atomic operation, to ensure that no other operation (read, write, or atomic) is performed on that memory line, which hazard bit is then cleared upon completion of the atomic operation. Additional, direct data paths provided for the PAU 270 executing the programmable atomic operations allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operations. When provided with the extended instruction set for executing programmable atomic operations, the PAU 270 can be embodied as one or more hybrid threading processors. In some example embodiments, the PAU 270 provides barrel-style, round-robin instantaneous thread switching to maintain a high instruction-per-clock rate.

Programmable atomic operations can be performed by the PAU 270 involving requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the built-in atomic operations, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic operation. Following the atomic operation, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache control circuit 215.

In selected examples, the approach taken for programmable atomic operations is to provide multiple, generic, custom atomic request types that can be sent through the chiplet network 285 to the memory controller chiplet 205 from an originating source such as a processor or other system component. The cache controllers 215 or off-die memory controller 220 identify the request as a custom atomic and forward the request to the PAU 270. In a representative embodiment, the PAU 270: (1) is a programmable processing element capable of efficiently performing a user defined atomic operation; (2) can perform load and stores to memory, arithmetic and logical operations and control flow decisions: and (3) leverages the RISC-V ISA with a set of new, specialized instructions to facilitate interacting with such controllers 215, 220 to atomically perform the user-defined operation. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared, by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

Figure 3:
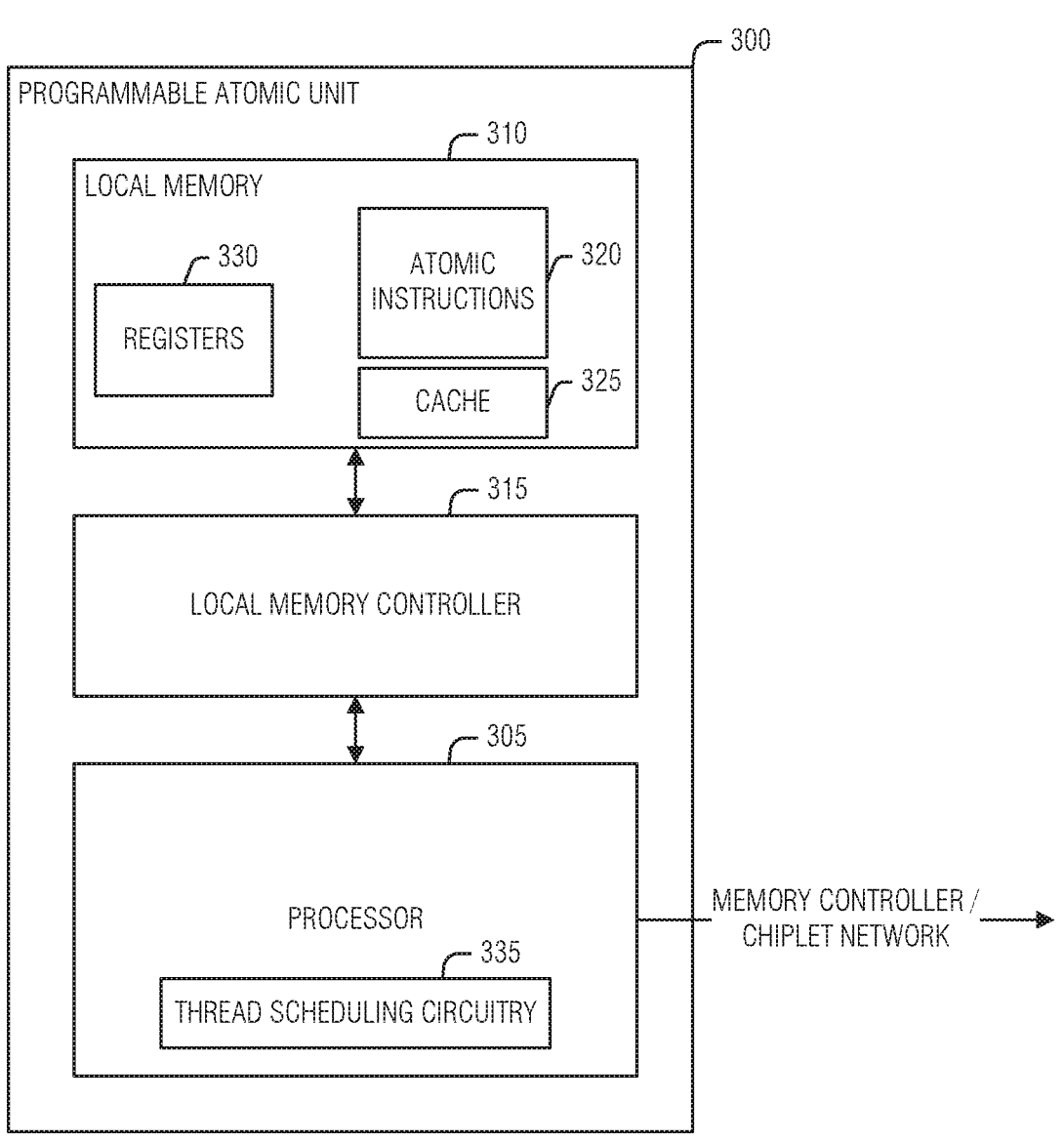
FIG. 3 illustrates components in an example of a programmable atomic unit (PAU), according to an embodiment.

FIG. 3 illustrates components in an example of a programmable atomic unit (PAU) 300, such as those noted above with respect to FIG. 1 (e.g., in the memory controller 140) and FIG. 2 (e.g., PAU 270), according to an embodiment. As illustrated, the PAU 300 includes a processor 305, local memory 310 (e.g., SRAM), and a controller 315 for the local memory 310.

In an example, the processor 305 is a barrel processor, with circuitry to switch between different register files (e.g., sets of registers containing current processing state) upon each clock cycle of the processor 305. Although processor 305 is discussed herein in an example implementation in PAU 300 of a memory controller chiplet 205, the configuration and operation of processor 305 may also be used in other functions of memory controller chiplet 205 (for example, to perform built-in atomic operations), or may be used in a variety of other contexts, including but not limited to, in other chiplets of a chiplet system 110. This configuration of a barrel processor enables efficient context switching between currently executing threads. In an example, the processor 305 supports eight threads, resulting in eight register files. In an example, some or all of the register files 330 are not integrated into the processor 305, but rather reside in the local memory 310. This reduces circuit complexity in the processor 305 by eliminating the traditional flip-flops used for these registers.

The local memory 310 can also house a cache and instructions for atomic operations 320. The atomic instructions 320 comprise sets of instructions to support the various application-loaded atomic operations. When an atomic operation is requested, e.g., by the application chiplet 125, a set of instructions corresponding to the atomic operation are executed by the processor 305. In an example, the instructions 320 reside in partitions of the local memory 310. In this example, the specific programmable atomic operation being requested by a requesting process can identify the programmable atomic operation by the partition number. The partition number can be established when the programmable atomic operation is registered with (e.g., loaded onto) the PAU 300. Additional metadata for the programmable atomic instructions, such as the partition tables, can also be stored in the local memory 310.

Atomic operations manipulate the cache 325, which is generally synchronized (e.g., flushed) when a thread for an atomic operation completes. Thus, aside from initial loading from the external memory, such as the off-die memory 275 or 280, latency is reduced for most memory operations during execution of a programmable atomic operation thread.

As noted above, a barrel processor, such as the processor 305, can experience an issue when an executing thread attempts to issue a memory request if an underlying hazard condition would prevent such a request. To address this situation, the processor 305 is configured with thread scheduling circuitry 335 to evaluate an instruction and reschedule the instruction if the instruction intends to perform a memory request. Generally, the processor 305 includes circuitry to enable one or more thread rescheduling points in the pipeline. The implementation described here includes at least one more rescheduling point. When a preceding instruction in a thread creates a hazard due to a cache updates or a memory request instruction, a later instruction in the thread should be rescheduled earlier to avoid having to recover further down the pipeline.

A hazard denotes any condition such that allowing (e.g., performing) the memory request will result in an inconsistent state for the thread. In an example, the hazard is an in-flight memory request. Here, whether or not the cache 325 includes data for the requested memory address, the presence of the in-flight memory request makes in uncertain what the data in the cache 325 at that address should be. Thus, the thread must wait for the in-flight memory request to be completed to operate on current data. Thus, the hazard is cleared when the memory request completes.

In another example, the hazard includes a dirty cache line. Although the dirty cache line generally indicates that the data in the cache 325 is current and the memory controller version of this data is not, an issue can arise on thread instructions that do not operate from the cache 325. An example of such an instruction uses a built-in atomic operator, or other separate hardware block, of the memory controller. In the context of the memory controller 205, the built-in atomic operators 265 and separate from the PAU 270 and do not have access of the cache 325 inside the PAU 270. Thus, a memory request for a built-in atomic operator is processed from the cache 210 or the off-die memory 275 or 280. If the cache line in the cache 325 is dirty, then the built-in atomic operator will not be operating on the most current data until the cache 325 is flushed to synchronize the cache 210 and the off-die memories 275 and 280. This same situation could occur with other hardware blocks of the memory controller, such as cryptography block, encoder, etc. The hazard is cleared when the cache 325 is flushed.

In an example, the processor 305 is used for thread execution control. Circuity in the processor 305, such as a thread scheduling circuitry 335, is configured to identify an instruction to place into a pipeline for the barrel processor 305. The instruction corresponds to a thread executing on the processor 305. The instruction may be obtained from an input queue register.

In an embodiment, the thread scheduling circuitry 335 is integrated in the barrel processor 305, the barrel processor 305 is included in a programmable atomic unit 270, and the programmable atomic unit 270 is included in a memory controller 205. In a further embodiment, the memory controller 205 is a chiplet in a chiplet system 110.

The processor 305, implementing the thread scheduling circuitry 335, is configured to read a hazard indication entry from a hazard data structure, where the hazard indication entry corresponds to the thread executing on the processor 305. The hazard indication entry is set by a preceding instruction in the thread. The hazard data structure includes an entry for each thread executing on the barrel processor.

In an example, the preceding instruction in the thread set the hazard indication entry to reflect an update to contents of a cache. In such a situation, the update to the contents of the cache causes the cache to be dirty with respect to a memory address pertinent to the thread.

In another example, the preceding instruction in the thread set the hazard indication entry to reflect a memory request made by the preceding instruction. In this situation, the hazard indication entry indicates that the request is outstanding with respect to a memory address pertinent to the thread.

The processor 305, implementing the thread scheduling circuitry 335, in response to reading the hazard indication entry, reschedules the thread to a later time based on the hazard identification.

The hazard data structure can be implemented as a bit array (or bit vector), with the hazard identification corresponding to an index in the bit array, each index in the array corresponding to a unique thread executing on the barrel processor. In this implementation, a logical one in the bit array at the index indicates a hazard exists and a logical zero indicates that a hazard does not exist.

In an example, the instruction includes a memory operation. Some instructions may not include memory operations. In such instances, the thread scheduling circuitry may identify a second instruction of the thread that is not making a memory request and place the second instruction into the pipeline without regard to the hazard indication entry.

Figure 4:
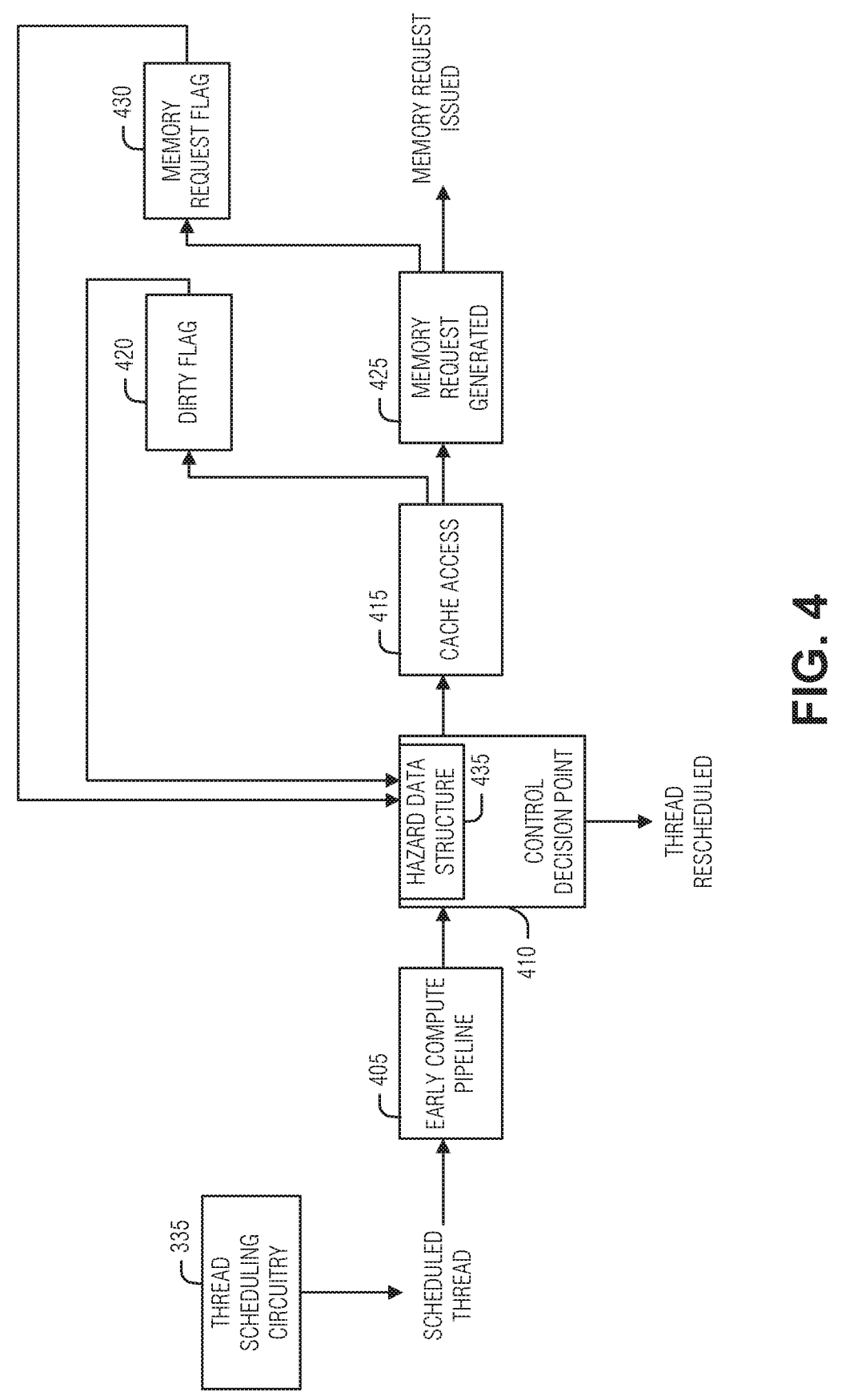
FIG. 4 is a block diagram illustrating control and data flow in a pipeline, according to an embodiment.

FIG. 4 is a block diagram illustrating control and data flow in a pipeline, according to an embodiment. In particular, FIG. 4 illustrates parts of a pipeline of a processor, such as processor 305. Threads enter the pipeline and operations are processed in the early compute pipeline 405. The early compute pipeline 405 may organize the threads and switch between threads on every clock cycle. Each thread is serviced in a round robin or barrel threaded mode. These operations may be performed by thread scheduling circuitry 335.

An executing thread is checked at the control decision point 410 for a hazard indication entry in a hazard data structure 435. Control decision point 410 may be implemented by thread scheduling circuitry 335. Alternatively, the control decision point 410 may be performed by circuitry in the pipeline, causing the operation to abort and having the thread rescheduled due to the hazard. The hazard indication entry is set by a preceding operation in the thread that performed or is performing a memory operation, such as a cache update or a memory request. If the preceding operation modified the contents of the cache 415, then as part of that operation, a dirty flag 420 is set in the hazard data structure 435. The cache 415 may be an instance of cache 325 stored in local memory 310 in PAU 300.

If the preceding operation initiated a memory request (operation 425), then a request flag 430 is set in the hazard data structure 435. When either the dirty flag or the request flag are set, then the later operation may be rescheduled early to avoid having to abort the operation later in the pipeline. As such, the control decision point 410 allows for the early detection of problematic memory requests in a barrel processor.

The hazard data structure 435 may be implemented as a bit array. In an embodiment, the cache and memory request information is back-propagated by way of a single bit per thread index for simple decoding at the control decision point 410. For instance, when there are eight threads being serviced by the barrel processor, a bit array of 8 bits may be used with each thread having a unique bit to indicate whether a dirty flag or memory request flag is set. The bit array may be a reserved address space in cache 325 or local memory 310. The bit array may alternatively be stored in an operational register, such as a pipeline register.

In an embodiment, the dirty flag and request flag are logically combined in an OR gate such that if either flag is a logical one, then the conflicting later operation is rescheduled.

In another embodiment, the hazard data structure bit array may be longer, and each thread may be assigned multiple bits in the bit array to provide the independent status of the dirty flag and the memory request. For instance, the bit array may be sixteen bits for eight threads, with the first thread corresponding with bit positions {0, 1}, the second thread corresponding with bit positions {2,3}, etc. In this case, the value of the two bits may denote up to four states: 00: dirty flag not set, memory request flag not set; 01: dirty flag not set, memory request flag set; 10: dirty flag set, memory request flag not set; and 11: dirty flag set, memory request flag set. Using multiple bits provides greater information resolution, which may be used by the control decision point 410 when rescheduling an operation or thread.

During execution, if a thread intends to make a memory request and the control decision point 410 detects a problem using the back-propagated information, the control decision point 410 can halt execution of the thread and reschedule it to retry execution through the scheduler normally. To reschedule the thread, the thread scheduler may place the instruction back in the scheduler's queue (e.g., input queue register) for future scheduling. If the thread does not intend to make a memory request, then the thread may continue execution.

Figure 5:
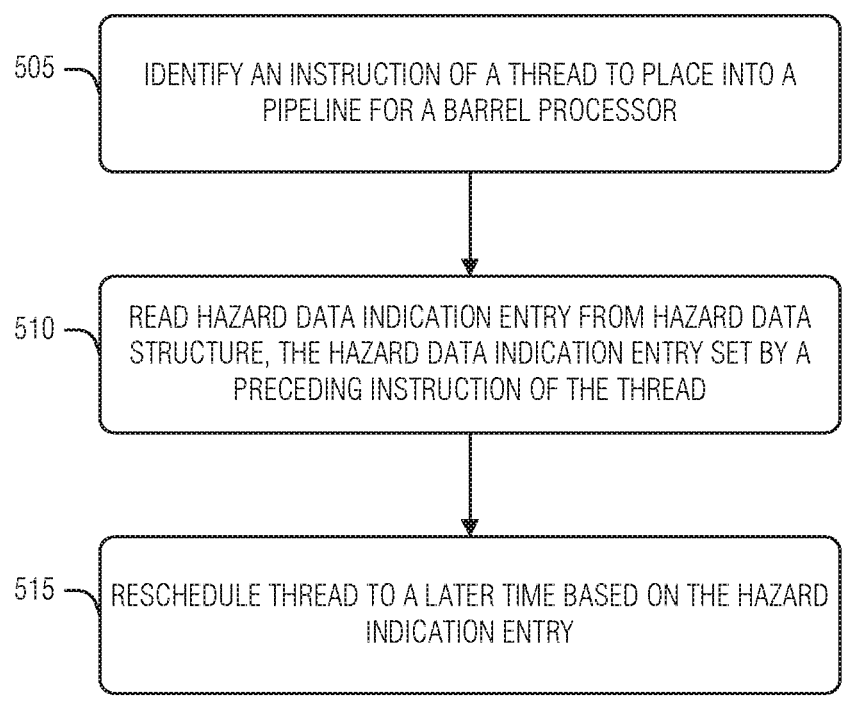
FIG. 5 is a flow chart of an example of a method for thread execution control in a barrel processor, according to an embodiment.

FIG. 5 is a flow chart of an example of a method for thread execution control in a barrel processor, according to an embodiment. Operations of the method 500 are performed by computer hardware, such as that described with respect to FIGS. 1A-1B (e.g., memory controller chiplet), FIG. 2, FIG. 3, or FIG. 6 (e.g., processing circuitry). For instance, the barrel processor is configured to perform operations through use of the thread scheduling circuitry. At 505, barrel processor, through use of thread scheduling circuitry, identifies an instruction to place into a pipeline for the barrel processor. The instruction corresponds to a thread that is being handled by the processor. The instruction may be an atomic operation. The atomic operation may be a built-in atomic or programmable atomic operation. The atomic operation may be stored in local memory 310 as atomic instructions 320.

At 510, a hazard indication entry from a hazard data structure is read. The hazard indication entry corresponds to the thread. The hazard indication entry is set by a preceding instruction in the thread. In an embodiment, the hazard data structure includes an entry for each thread executing on the barrel processor.

In an embodiment, the preceding instruction in the thread set the hazard indication entry to reflect an update to contents of a cache. In a further embodiment, the update to the contents of the cache causes the cache to be dirty with respect to a memory address pertinent to the thread. Because the location in cache is marked dirty, the current instruction may be unable to use the data. As such, the current instruction may be rescheduled.

In a related embodiment, the preceding instruction in the thread set the hazard indication entry to reflect a memory request made by the preceding instruction. In a further embodiment, the hazard indication entry indicates that the request is outstanding with respect to a memory address pertinent to the thread. In this situation as well, the current instruction may be rescheduled.

Consequently, in general, at 515, in response to reading the hazard indication entry, the thread is rescheduled to a later time based on the hazard indication entry.

In an embodiment, the hazard data structure is a bit array, with the hazard identification corresponding to an index in the bit array, each index in the array corresponding to a unique thread executing on the barrel processor. In an example where eight threads are executing on the barrel processor, the hazard data structure may be implemented as an 8-bit array, with each executing thread corresponding to a unique bit position in the array. When the current instruction is being evaluated as to whether it should be allowed to proceed further down the pipeline, the bit corresponding to the thread is checked. A logical one in the bit array at the index indicates a hazard exists and a logical zero indicates that a hazard does not exist. The hazard may be the logical OR of the dirty cache state and the memory request state, such that if either state is affirmative, then the hazard is considered to exist.

In an embodiment, the instruction includes a memory operation. In a further embodiment, a second instruction of the thread that is not making a memory request is identified. The second instruction is placed into the pipeline without regard to the hazard indication entry. This is possible because the hazard indication entry is related to memory operations that cause an indeterminate state for later instructions in the pipeline.

In an embodiment, the thread scheduling circuitry is integrated in the barrel processor, the barrel processor is included in a programmable atomic unit, and the programmable atomic unit is included in a memory controller. In a further embodiment, the memory controller is a chiplet in a chiplet system, such as chiplet system 110.

Figure 6:
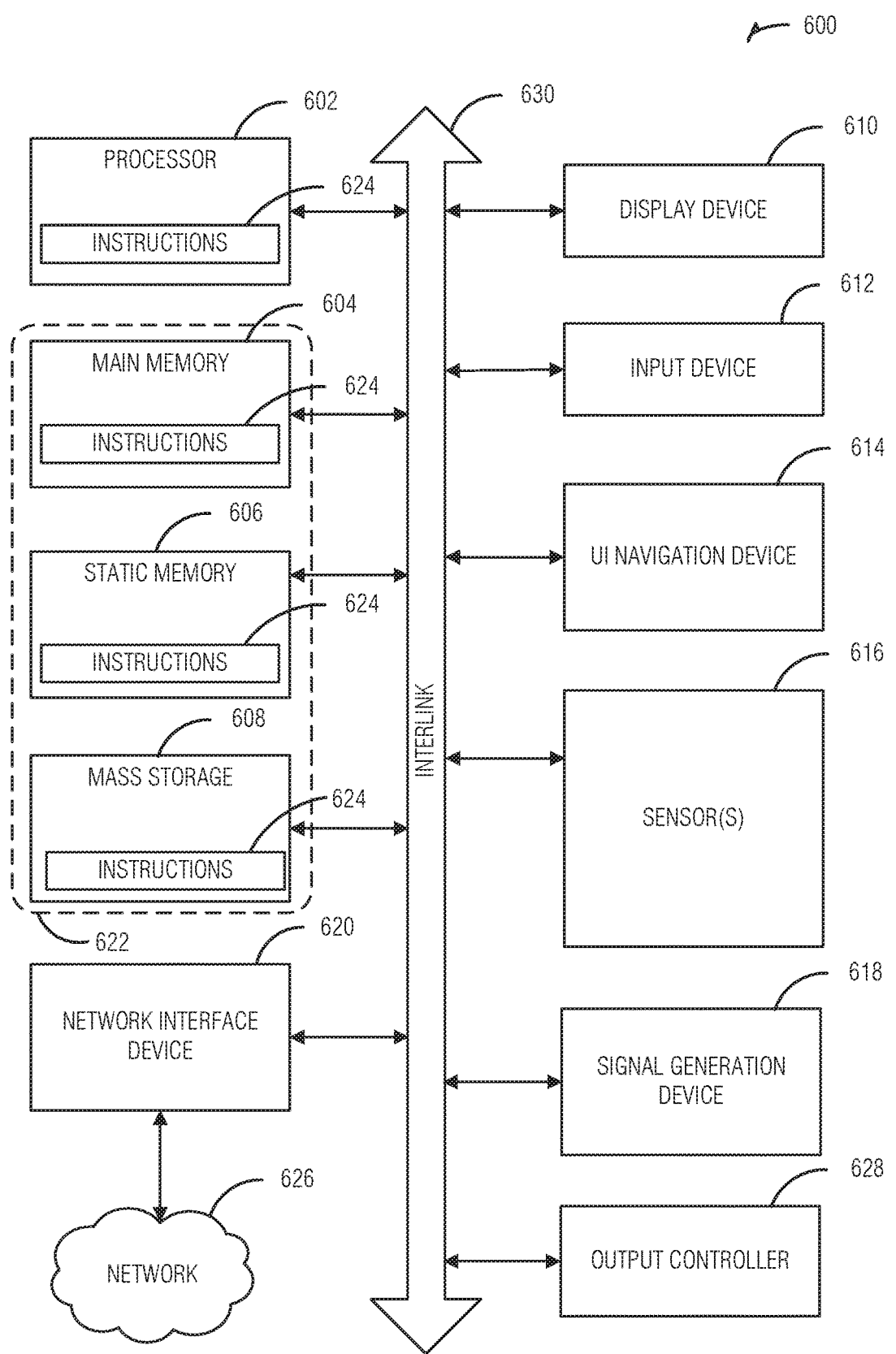
FIG. 6 is a block diagram of an example of a machine with which, in which, or by which embodiments of the present disclosure can operate.

FIG. 6 illustrates a block diagram of an example machine 600 with which, in which, or by which any one or more of the techniques (e.g., methodologies) discussed herein can be implemented. Examples, as described herein, can include, or can operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership can be flexible over time. Circuitries include members that can, alone or in combination, perform specified operations when operating, thus processing circuitry in various instances, for example in various controllers as described in the specification, can include one or more processors, or cores of processors, or other instruction-executing devices. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 can include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drives, tape drives, flash storage, or other block devices) some or all of which can communicate with each other via an interlink (e.g., bus) 630. The machine 600 can further include a display unit 610, an alphanumeric input device 612 (e.g., a keyboard), and a user interface (UI) navigation device 614 (e.g., a mouse). In an example, the display unit 610, input device 612 and UI navigation device 614 can be a touch screen display. The machine 600 can additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 can include an output controller 628, such as a serial (e.g., universal serial bus (USB)), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 can be, or include, a machine readable medium 622 on which is stored one or more sets of data structures or instructions 624 (e.g., software) embodying or utilized by any one or more of the techniques or functions described herein. The instructions 624 can also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 can constitute the machine readable media 622. While the machine readable medium 622 is illustrated as a single medium, the term "machine readable medium" can include a single medium or multiple media (e.g., a centralized or distributed database, or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 622 can be representative of the instructions 624, such as instructions 624 themselves or a format from which the instructions 624 can be derived.

This format from which the instructions 624 can be derived can include source code, encoded instructions (e.g., in compressed or encrypted form), packaged instructions (e.g., split into multiple packages), or the like. The information representative of the instructions 624 in the machine readable medium 622 can be processed by processing circuitry into the instructions to implement any of the operations discussed herein. For example, deriving the instructions 624 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 624.

In an example, the derivation of the instructions 624 can include assembly, compilation, or interpretation of the information (e.g., by the processing circuitry) to create the instructions 624 from some intermediate or preprocessed format provided by the machine readable medium 622. The information, when provided in multiple parts, can be combined, unpacked, and modified to create the instructions 624. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 624 can be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium. To better illustrate the methods and apparatuses described herein, a non-limiting set of Example embodiments are set forth below as numerically identified Examples.

Example 1 is an apparatus, comprising: a barrel processor, comprising: local memory including a hazard data structure; and thread scheduling circuitry; wherein the barrel processor is configured to perform operations through use of the thread scheduling circuitry, the operations including: identifying an instruction to place into a pipeline for the barrel processor, the instruction corresponding to a thread; reading a hazard indication entry from a hazard data structure, the hazard indication entry corresponding to the thread, and wherein the hazard indication entry is set by a preceding instruction in the thread; and in response to reading the hazard indication entry, rescheduling the thread to a later time based on the hazard identification.

In Example 2, the subject matter of Example 1 includes, wherein the hazard data structure includes an entry for each thread executing on the barrel processor.

In Example 3, the subject matter of Examples 1-2 includes, wherein the preceding instruction in the thread set the hazard indication entry to reflect an update to contents of a cache.

In Example 4, the subject matter of Example 3 includes, wherein the update to the contents of the cache causes the cache to be dirty with respect to a memory address pertinent to the thread.

In Example 5, the subject matter of Examples 1-4 includes, wherein the preceding instruction in the thread set the hazard indication entry to reflect a memory request made by the preceding instruction.

In Example 6, the subject matter of Example 5 includes, wherein the hazard indication entry indicates that the request is outstanding with respect to a memory address pertinent to the thread.

In Example 7, the subject matter of Examples 1-6 includes, wherein the hazard data structure is a bit array, with the hazard identification corresponding to an index in the bit array, each index in the array corresponding to a unique thread executing on the barrel processor.

In Example 8, the subject matter of Example 7 includes, wherein a logical one in the bit array at the index indicates a hazard exists and a logical zero indicates that a hazard does not exist.

In Example 9, the subject matter of Examples 1-8 includes, wherein the instruction includes a memory operation.

In Example 10, the subject matter of Example 9 includes, wherein the barrel processor is configured, using the thread scheduling circuitry to: identify a second instruction of the thread that is not making a memory request; and place the second instruction into the pipeline without regard to the hazard indication entry.

In Example 11, the subject matter of Examples 1-10 includes, wherein the thread scheduling circuitry is integrated in the barrel processor, the barrel processor included in a programmable atomic unit, and the programmable atomic unit is included in a memory controller.

In Example 11, the subject matter of Example 11 includes, wherein the memory controller is a chiplet in a chiplet system.

Example 13 is a method, comprising: identifying, at a thread scheduling circuitry, an instruction to place into a pipeline for a barrel processor, the instruction corresponding to a thread; reading a hazard indication entry from a hazard data structure, the hazard indication entry corresponding to the thread, and wherein the hazard indication entry is set by a preceding instruction in the thread; and in response to reading the hazard indication entry, rescheduling the thread to a later time based on the hazard identification.

In Example 13, the subject matter of Example 13 includes, wherein the hazard data structure includes an entry for each thread executing on the barrel processor.

In Example 15, the subject matter of Examples 13-13 includes, wherein the preceding instruction in the thread set the hazard indication entry to reflect an update to contents of a cache.

In Example 15, the subject matter of Example 15 includes, wherein the update to the contents of the cache causes the cache to be dirty with respect to a memory address pertinent to the thread.

In Example 17, the subject matter of Examples 13-16 includes, wherein the preceding instruction in the thread set the hazard indication entry to reflect a memory request made by the preceding instruction.

In Example 17, the subject matter of Example 17 includes, wherein the hazard indication entry indicates that the request is outstanding with respect to a memory address pertinent to the thread.

In Example 19, the subject matter of Examples 13-18 includes, wherein the hazard data structure is a bit array, with the hazard identification corresponding to an index in the bit array, each index in the array corresponding to a unique thread executing on the barrel processor.

In Example 19, the subject matter of Example 19 includes, wherein a logical one in the bit array at the index indicates a hazard exists and a logical zero indicates that a hazard does not exist.

In Example 21, the subject matter of Examples 13-20 includes, wherein the instruction includes a memory operation.

In Example 21, the subject matter of Example 21 includes, identifying a second instruction of the thread that is not making a memory request; and placing the second instruction into the pipeline without regard to the hazard indication entry.

In Example 23, the subject matter of Examples 13-22 includes, wherein the thread scheduling circuitry is integrated in the barrel processor, the barrel processor included in a programmable atomic unit, and the programmable atomic unit is included in a memory controller.

In Example 24, the subject matter of Example 23 includes, wherein the memory controller is a chiplet in a chiplet system.

Example 25 is a machine-readable medium including instructions, which when executed by a barrel processor having thread scheduling circuitry, cause the barrel processor to: identify an instruction to place into a pipeline for the barrel processor, the instruction corresponding to a thread; read a hazard indication entry from a hazard data structure, the hazard indication entry corresponding to the thread, and wherein the hazard indication entry is set by a preceding instruction in the thread; and in response to reading the hazard indication entry, reschedule the thread to a later time based on the hazard identification.

In Example 26, the subject matter of Example 25 includes, wherein the hazard data structure includes an entry for each thread executing on the barrel processor.

In Example 25, the subject matter of Examples 25-26 includes, wherein the preceding instruction in the thread set the hazard indication entry to reflect an update to contents of a cache.

In Example 28, the subject matter of Example 27 includes, wherein the update to the contents of the cache causes the cache to be dirty with respect to a memory address pertinent to the thread.

In Example 29, the subject matter of Examples 25-28 includes, wherein the preceding instruction in the thread set the hazard indication entry to reflect a memory request made by the preceding instruction.

In Example 30, the subject matter of Example 29 includes, wherein the hazard indication entry indicates that the request is outstanding with respect to a memory address pertinent to the thread.

In Example 31, the subject matter of Examples 25-30 includes, wherein the hazard data structure is a bit array, with the hazard identification corresponding to an index in the bit array, each index in the array corresponding to a unique thread executing on the barrel processor.

In Example 32, the subject matter of Example 31 includes, wherein a logical one in the bit array at the index indicates a hazard exists and a logical zero indicates that a hazard does not exist.

In Example 33, the subject matter of Examples 25-32 includes, wherein the instruction includes a memory operation.

In Example 34, the subject matter of Examples 9-33 includes, instructions to: identify a second instruction of the thread that is not making a memory request; and place the second instruction into the pipeline without regard to the hazard indication entry.

In Example 35, the subject matter of Examples 25-34 includes, wherein the thread scheduling circuitry is integrated in the barrel processor, the barrel processor included in a programmable atomic unit, and the programmable atomic unit is included in a memory controller.

In Example 36, the subject matter of Example 35 includes, wherein the memory controller is a chiplet in a chiplet system.

Example 37 is an apparatus, comprising: means for identifying, at a barrel processor having a thread scheduling circuitry, an instruction to place into a pipeline for the barrel processor, the instruction corresponding to a thread; means for reading a hazard indication entry from a hazard data structure, the hazard indication entry corresponding to the thread, and wherein the hazard indication entry is set by a preceding instruction in the thread; and means for in response to reading the hazard indication entry, rescheduling the thread to a later time based on the hazard identification.

In Example 38, the subject matter of Example 37 includes, wherein the hazard data structure includes an entry for each thread executing on the barrel processor.

In Example 39, the subject matter of Examples 37-38 includes, wherein the preceding instruction in the thread set the hazard indication entry to reflect an update to contents of a cache.

In Example 40, the subject matter of Example 39 includes, wherein the update to the contents of the cache causes the cache to be dirty with respect to a memory address pertinent to the thread.

In Example 41, the subject matter of Examples 37-37 includes, wherein the preceding instruction in the thread set the hazard indication entry to reflect a memory request made by the preceding instruction.

In Example 42, the subject matter of Example 41 includes, wherein the hazard indication entry indicates that the request is outstanding with respect to a memory address pertinent to the thread.

In Example 43, the subject matter of Examples 37-42 includes, wherein the hazard data structure is a bit array, with the hazard identification corresponding to an index in the bit array, each index in the array corresponding to a unique thread executing on the barrel processor.

In Example 44, the subject matter of Example 43 includes, wherein a logical one in the bit array at the index indicates a hazard exists and a logical zero indicates that a hazard does not exist.

In Example 45, the subject matter of Examples 37-44 includes, wherein the instruction includes a memory operation.

In Example 46, the subject matter of Example 45 includes, means for identifying a second instruction of the thread that is not making a memory request; and means for placing the second instruction into the pipeline without regard to the hazard indication entry.

In Example 47, the subject matter of Examples 37-46 includes, wherein the thread scheduling circuitry is integrated in the barrel processor, the barrel processor included in a programmable atomic unit, and the programmable atomic unit is included in a memory controller.

In Example 48, the subject matter of Example 47 includes, wherein the memory controller is a chiplet in a chiplet system.

Example 49 is an apparatus, comprising: a memory controller chiplet in a chiplet system, the memory controller chiplet comprising: a programmable atomic unit, the programmable atomic unit comprising: a barrel processor, the barrel processor comprising: local memory including a hazard data structure; and thread scheduling circuitry; wherein the barrel processor is configured to perform operations through use of the thread scheduling circuitry, the operations including: identifying an instruction to place into a pipeline for the barrel processor, the instruction corresponding to a thread; reading a hazard indication entry from a hazard data structure, the hazard indication entry corresponding to the thread, and wherein the hazard indication entry is set by a preceding instruction in the thread; and in response to reading the hazard indication entry, rescheduling the thread to a later time based on the hazard identification.

In Example 50, the subject matter of Example 49 includes, wherein the hazard data structure includes an entry for each thread executing on the barrel processor.

In Example 51, the subject matter of Examples 49-50 includes, wherein the preceding instruction in the thread set the hazard indication entry to reflect an update to contents of a cache.

In Example 52, the subject matter of Example 51 includes, wherein the update to the contents of the cache causes the cache to be dirty with respect to a memory address pertinent to the thread.

In Example 49, the subject matter of Examples 49-52 includes, wherein the preceding instruction in the thread set the hazard indication entry to reflect a memory request made by the preceding instruction.

In Example 54, the subject matter of Example 53 includes, wherein the hazard indication entry indicates that the request is outstanding with respect to a memory address pertinent to the thread.

In Example 55, the subject matter of Examples 49-54 includes, wherein the hazard data structure is a bit array, with the hazard identification corresponding to an index in the bit array, each index in the array corresponding to a unique thread executing on the barrel processor.

In Example 56, the subject matter of Example 55 includes, wherein a logical one in the bit array at the index indicates a hazard exists and a logical zero indicates that a hazard does not exist.

In Example 57, the subject matter of Examples 49-56 includes, wherein the instruction includes a memory operation.

In Example 58, the subject matter of Examples 56-57 includes, wherein the barrel processor is configured, using the thread scheduling circuitry to: identify a second instruction of the thread that is not making a memory request; and place the second instruction into the pipeline without regard to the hazard indication entry.

Example 59 is at least one machine-readable medium including instructions that, when executed by processing circuitry, cause the processing circuitry to perform operations to implement of any of Examples 1-58.

Example 60 is an apparatus comprising means to implement of any of Examples 1-58.

Example 61 is a system to implement of any of Examples 1-58.

Example 62 is a method to implement of any of Examples 1-58.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus, comprising:
   a barrel processor, comprising:

local memory including a hazard data structure the hazard data structure being a per-thread hardware bit array resident in the local memory; and thread scheduling circuitry including a dedicated combinational memory hazard unit that gates an early pipeline stage within the barrel processor;

wherein the barrel processor is configured to perform operations through use of the thread scheduling circuitry, the operations including:

identifying, by the thread scheduling circuitry, an instruction to place into the early pipeline stage for the barrel processor, the identified instruction corresponding to a thread;

reading, by the memory hazard unit, a hazard indication entry from the hazard data structure before placing the identified instruction into the early pipeline stage, the hazard indication entry corresponding to the thread via the hardware bit array, and wherein the hazard indication entry was set by memory access circuitry, based on whether operations performed by a preceding instruction in the thread caused an indeterminate state for the identified instruction; and in response to reading the hazard indication entry via the hardware bit array and before placing the identified instruction into the early pipeline stage for the barrel processor, rescheduling by the thread scheduling circuitry, the thread to a later time based on the hazard indication entry.

2. The apparatus of claim 1, wherein the hazard data structure includes an entry for each thread executing on the barrel processor.

3. The apparatus of claim 1, wherein the preceding instruction in the thread set the hazard indication entry to reflect an update to contents of a cache.

4. The apparatus of claim 3, wherein the update to the contents of the cache causes the cache to be dirty with respect to a memory address pertinent to the thread.

5. The apparatus of claim 1, wherein the preceding instruction in the thread set the hazard indication entry to reflect a memory request made by the preceding instruction.

6. The apparatus of claim 5, wherein the hazard indication entry indicates that the memory request is outstanding with respect to a memory address pertinent to the thread.

7. The apparatus of claim 1, wherein the hazard data structure is a bit array, with the hazard indication entry corresponding to an index in the bit array, each index in the bit array corresponding to a unique thread executing on the barrel processor.

8. The apparatus of claim 7, wherein a logical one in the bit array at the index indicates a hazard exists and a logical zero indicates that a hazard does not exist.

9. The apparatus of claim 1, wherein the instruction includes a memory operation.

10. The apparatus of claim 9, wherein the barrel processor is configured, using the thread scheduling circuitry to:

identify a second instruction of the thread that is not making a memory request; and place the second instruction into the pipeline without regard to the hazard indication entry.

11. The apparatus of claim 1, wherein the thread scheduling circuitry is integrated in the barrel processor, the barrel processor included in a programmable atomic unit, and the programmable atomic unit is included in a memory controller.

12. The apparatus of claim 11, wherein the memory controller is a chiplet in a chiplet system.

13. The apparatus of claim 1, wherein the operations include:

in response to reading the hazard indication entry, aborting the instruction from the pipeline before rescheduling the instruction to the later time.

14. A method comprising:

identifying, by a thread scheduling circuitry, an instruction to place into an early pipeline stage for a barrel processor, the instruction corresponding to a thread;

reading, by a memory hazard unit that gates the early pipeline stage within the barrel processor in the thread scheduling circuitry, a hazard indication entry from a hazard data structure before placing the identified instruction into the early pipeline stage, the hazard data structure being a per-thread hardware bit array resident in a local memory device accessible by the thread scheduling circuitry, the hazard indication entry corresponding to the thread via the hardware bit array, and wherein the hazard indication entry is set by memory access circuitry, based on whether operations performed by a preceding instruction in the thread caused an indeterminate state for the identified instruction; and in response to reading the hazard indication entry via the hardware bit array and before placing the identified instruction into the early pipeline stage for the barrel processor, rescheduling, by the thread scheduling circuitry, the thread to a later time based on the hazard indication entry.

15. The method of claim 14, wherein the hazard data structure includes an entry for each thread executing on the barrel processor.

16. The method of claim 14, wherein the preceding instruction in the thread set the hazard indication entry to reflect an update to contents of a cache.

17. The method of claim 16, wherein the update to the contents of the cache causes the cache to be dirty with respect to a memory address pertinent to the thread.

18. The method of claim 14, wherein the preceding instruction in the thread set the hazard indication entry to reflect a memory request made by the preceding instruction.

19. The method of claim 18, wherein the hazard indication entry indicates that the memory request is outstanding with respect to a memory address pertinent to the thread.

20. The method of claim 14, wherein the hazard data structure is a bit array, with the hazard indication entry corresponding to an index in the bit array, each index in the bit array corresponding to a unique thread executing on the barrel processor.

21. The method of claim 20, wherein a logical one in the bit array at the index indicates a hazard exists and a logical zero indicates that a hazard does not exist.

22. The method of claim 14, wherein the instruction includes a memory operation.

23. The method of claim 22, comprising:

identifying a second instruction of the thread that is not making a memory request; and placing the second instruction into the pipeline without regard to the hazard indication entry.

24. An apparatus, comprising:

a memory controller chiplet in a chiplet system, the memory controller chiplet comprising: a programmable atomic unit, the programmable atomic unit comprising:

a barrel processor, the barrel processor comprising:

local memory including a hazard data structure, the hazard data structure being a per-thread hardware bit array resident in the local memory; and thread scheduling circuitry including a dedicated combinational memory hazard unit that gates an early pipeline stage within the barrel processor;

wherein the barrel processor is configured to perform operations through use of the thread scheduling circuitry, the operations including:

identifying, by the thread scheduling circuitry, an instruction to place into the early pipeline stage for the barrel processor, the instruction corresponding to a thread;

reading, by the memory hazard unit, a hazard indication entry from the hazard data structure before placing the identified instruction into the early pipeline stage, the hazard indication entry corresponding to the thread via the hardware bit array, and wherein the hazard indication entry is set by memory access circuitry, based on whether operations performed by a preceding instruction in the thread caused an indeterminate state for the identified instruction; and in response to reading the hazard indication entry via the hardware bit array and before placing the identified instruction into the early pipeline stage, rescheduling by the thread scheduling circuitry, the thread to a later time based on the hazard indication entry.

25. The apparatus of claim 24, wherein the hazard data structure includes an entry for each thread executing on the barrel processor.

26. The apparatus of claim 24, wherein the preceding instruction in the thread set the hazard indication entry to reflect an update to contents of a cache.

\* \* \* \* \*